United States Patent [19]
Nicolas

[11] Patent Number: 5,151,825
[45] Date of Patent: Sep. 29, 1992

[54] DEVICE FOR THE GENERATION OF SEVERAL BEAMS OF LIGHT INCLUDING A LIGHT SPLITTER

[75] Inventor: Christophe Nicolas, Paris, France

[73] Assignee: Thomson-CSF, Puteaux, France

[21] Appl. No.: 762,372

[22] Filed: Sep. 19, 1991

[30] Foreign Application Priority Data

Sep. 28, 1990 [FR] France .................. 90 11991

[51] Int. Cl.[5] .................. G02B 27/14; G02B 5/28
[52] U.S. Cl. .................. 359/634; 359/636
[58] Field of Search .............. 359/589, 590, 634, 636, 359/638, 629, 890, 613; 358/60

[56] References Cited

U.S. PATENT DOCUMENTS 4,850,685  7/1989  Kamakura et al. .................. 359/634
4,943,154  7/1990  Miyatake et al. .................. 359/629

FOREIGN PATENT DOCUMENTS 0307203  3/1989  European Pat. Off. .

OTHER PUBLICATIONS

Patent Abstract of Japan, vol. 9, No. 174 (P-374) [1897], Jul. 19, 1985, & JP-A-0-49314, Mar. 18, 1985, T. Satomi, "Optical Path Dividing and Color Separating Device for Color Image Readout Optical System".

Primary Examiner—Jon W. Henry
Attorney, Agent, or Firm—Oblon, Spivak, McClelland, Maier & Neustadt

[57] ABSTRACT

A device for the generation of several light beams is used notably to illuminate light spatial modulation screens with the 16/9 format in color image projectors. The aim is to improve the luminous efficiency. The disclosed generator device has a light source producing a primary beam and two wavelength selective mirrors. The two selective mirrors are illuminated by the primary beam and produce two secondary beams of different wavelengths. On the one hand, the two selective mirrors are placed side by side and intercept different parts of the section of the primary beam. On the other hand, a rear face that is at least partially reflective is positioned opposite the source with respect to the selective mirrors.

13 Claims, 2 Drawing Sheets

DEVICE FOR THE GENERATION OF SEVERAL BEAMS OF LIGHT INCLUDING A LIGHT SPLITTER

BACKGROUND OF THE INVENTION

1. Field of the Invention

The invention relates to a device that simultaneously produces several beams of light corresponding to different spectral domains.

The invention can be applied particularly (but not exclusively) to the illumination of screens for the spatial modulation of light in color image projectors.

2. Description of the Prior Art

In video projectors of images, whether colored or not, the image to be projected is formed on the surface of the light spatial modulator screen. This screen is generally formed by a liquid crystal matrix cell. The light given by a light source is spatially modulated by the matrix, and the projected image results from this modulation.

One of the problems of these projectors is that their luminous efficiency is low, of the order of a few per cent, and this problem is even more marked with color projectors. For, in many color projectors, the polychromatic image is obtained by the superimposition of three monochromatic images. In this type of color projector, it is standard practice to use a single source producing a beam of white light or primary beam and to separate this primary beam into three monochromatic beams, each corresponding to one of the primary colors. Each monochromatic beam is modulated by a spatial modulator, and the three modulated monochromatic beams, each corresponding to one of the primary colors, are then superimposed to form the image.

The low luminous efficiency of the image projectors is related to different causes, one of which lies in the light losses due to the differences between the shape of the light modulator screen to be illuminated and the shape of the section of the beam coming from the light source.

Thus, for example, in the context of the development of high-definition, wide-screen television sets, the image is designed with a 16/9 format (the ratio of the length to the width). An image-projecting system meeting this definition uses a spatial modulator screen having this 16/9 format. In this case, assuming, in the most common example, that the light beam coming from the source has a circular section, the fraction of light energy used to illuminate the rectangle constituted by the spatial modulator screen corresponds only to the SR/SF ratio of the area SR of this rectangle to the area SF of the section of the beam, giving 0.54 at best, i.e. when SR is as great as possible, at the format 16/9 while, at the same time, being contained in SF.

SUMMARY OF THE INVENTION

The present invention proposes a novel arrangement of the light source and of the means that separate the beam of white light or primary beam into several secondary beams, each having a different spectral domain and a rectangular section. The invention can be applied advantageously when at least two secondary beams are necessary, especially with a 16/9 format, irrespectively of the shape of the section of the primary beam, and its use notably in color video projectors enables a very promising improvement of the luminous efficiency of these projectors.

According to the invention, there is proposed a light beam generator device, comprising a light source producing a light beam called a primary beam, the spectrum of which is substantially that of visible light, a light splitter illuminated by the primary beam and producing, in return, at least two secondary beams corresponding to different wavelengths, the first and second of the secondary beams being obtained respectively by means of a first mirror and second mirror that are selective in wavelength, wherein the first and second selective mirrors are positioned so as to intercept different parts of the section of the primary beam, and wherein the light splitter further has a rear face at least partially constituting a total mirror, the rear face being, firstly, located opposite the light source with respect to the first and second selective mirrors and being, secondly, in a plane perpendicular to an axis of propagation of the primary beam.

BRIEF DESCRIPTION OF THE DRAWINGS

The invention will be understood more clearly from the following description, made by way of a non-restrictive example, with reference to the appended drawings, of which.

DETAILED DESCRIPTION OF THE INVENTION

Figure 1:
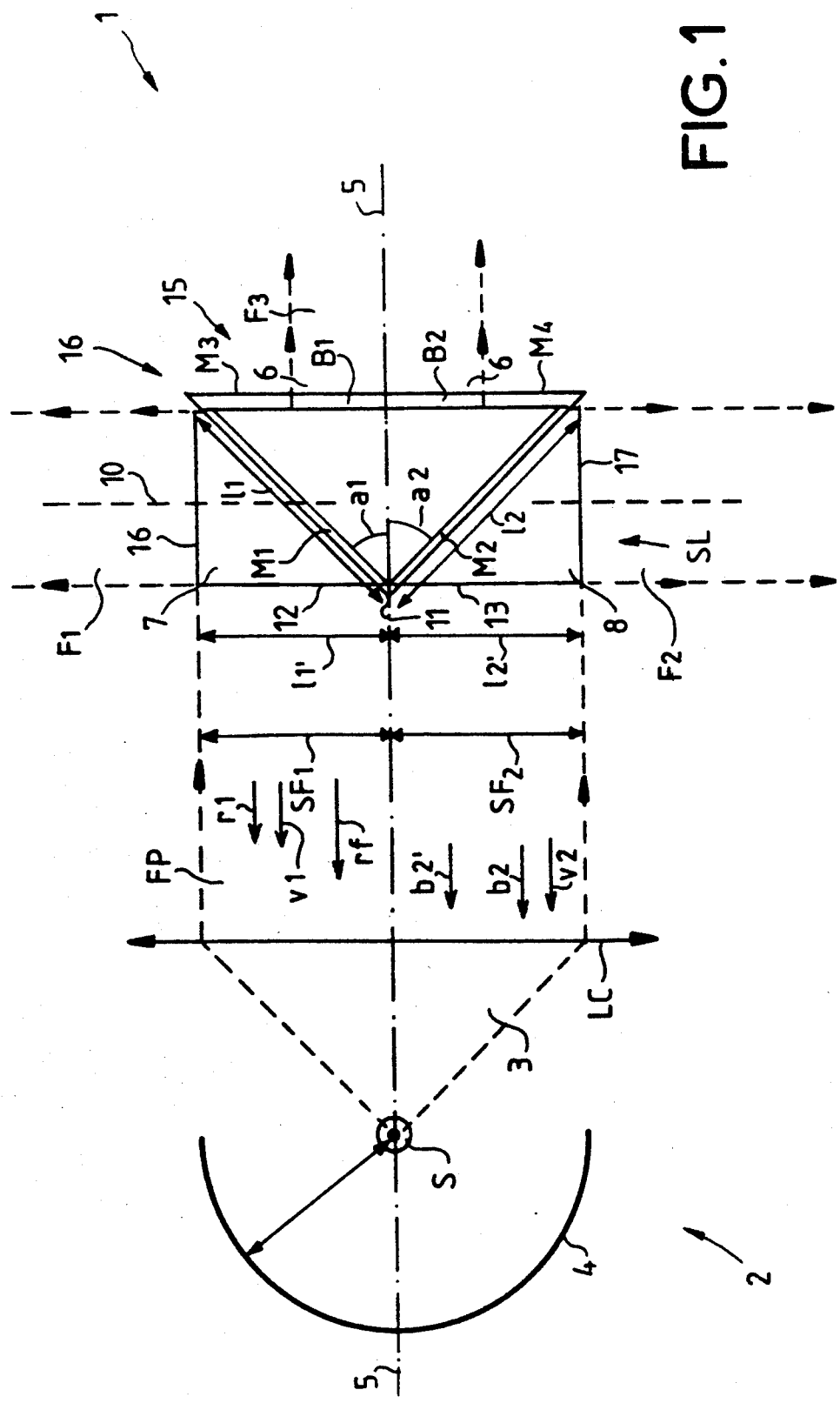
FIG. 1 gives a schematic view of the beam generator device according to the invention.

FIG. 1 shows a non-restrictive exemplary view of the light beam generator device 1 according to the invention.

The generator device 1 comprises a light source 2 producing a light beam called a primary beam FP. The primary beam is designed to generate several secondary beams, and its spectrum should cover the spectral domains of these secondary beams. In the case, for example, of an application to a projector of color images, the spectrum of the primary beam corresponds substantially to that of the visible light, so as to enable the production of three monochromatic secondary beams F1, F2, F3, one for the blue, another for the red and a third for the green.

The primary beam FP is a beam with substantially parallel rays, such as those obtained with white light sources commonly available in the market, of the type comprising a parabolic reflector for example. It is also possible, to this effect, as shown in FIG. 1, to use a standard source S of white light placed between a spherical reflector 4 and a collimation lens LC and on the optical axis 5 of this lens, in the center of curvature of the spherical reflector and at the focal point of the lens LC. The source S produces a light 3 collimated by the lens LC so as to form the primary beam FP. The optical axis of the collimator lens constitutes the axis of propagation 5 of the primary beam FP.

The primary beam FP is propagated towards a light splitter device SL of the type comprising several wavelength selective mirrors, each selective mirror being reflective for a given wavelength. Selective mirrors such as these exist in dichroic tubes (commonly available in the market) that notably make it possible, firstly, to reflect two beams of different colors (blue and red for example) in opposite directions and, secondly, to transmit a third beam of a third color, green for example.

According to one characteristic of the invention, the light splitter SL comprises a first wavelength selective mirror and a second wavelength selective mirror, M1, M2, interposed in the path of the primary beam FP so that each selective mirror intercepts a different part SF1, SF2 of the section of the primary beam FP. The first mirror M1 reflects, for example, the wavelengths that correspond to the blue with which they form a first secondary beam F1; and the second selective mirror M2 reflects, for example, the wavelengths that correspond to the red, with which they form a second secondary beam F2.

The light splitter SL further has a rear face 15, at least partially reflecting all the wavelengths, positioned opposite the light source 2 with respect to the first and second selective mirrors M1, M2. In the non-restrictive example described, the rear face 15 has a window 6 designed to transmit a third secondary beam F3.

In a preferred embodiment, the first and second selective mirrors M1, M2 as well as the rear face 15 are borne by a block 16 (made of glass for example) that is transparent to light, forming a triangular sectioned prism seen in FIG. 1 by its section. The rear face 15 is on the hypoteneuse face of the prism, and the two selective mirrors M1, M2 are on the other two faces.

A first transparent part and a second transparent part 7, 8 are applied respectively to the first and second selective mirrors M1, M2 in order to prevent major refraction angles at the selective mirrors M1, M2. The shape of these parts 7, 8 is such that their input face, 12, 13 respectively, and their output face 16, 17 are respectively normal to the incident and emergent rays.

According to another characteristic of the invention, the first and second selective mirrors M1, M2, seen from the light source 2, each have a rectangular apparent surface SA.

The two selective mirrors M1, M2 are inclined on the axis of propagation 5, with which they preferably (but not imperatively) form equal angles of inclination a1, a2. The area of the apparent surface SA is equal to that of the real surface SR multiplied by the sine of the inclination angle a1, a2.

Thus, the first selective mirror and the second selective mirror respectively reflect a first secondary beam and a second secondary beam F1, F2 corresponding to the blue and the red, and the section of each of these two secondary beams is equal to the apparent surface area of the selective mirror that has generated it.

In fact, the invention finds one of its most promising applications when each secondary beam F1, F2 is given a rectangular section at the 16/9 format. This is because such formats, placed beside one another, constitute an almost square surface.

Indeed, the first and second selective mirrors M1, M2 are positioned side by side, their length is in a plane perpendicular to that of the figure, and their width 11, 12 is greater than their apparent width 11', 12' seen from the light source 2. If their width 11', 12' is such that, depending on the angles of inclination a1, a2, their apparent width 11', 12 gives them an apparent surface at the 16/9 format, the total surface area of the section of the primary beam FP intersected by the two selective mirrors M1, M2 is close to a square.

Consequently, the assembly of the invention improves the ratio of the quantity of energy taken to the quantity of energy available in the primary beam FP.

When the apparent surfaces of the selective mirrors M1, M2 are given a 16/9 format, a 16/9 format is also given to the section of each of the first and second secondary beams F1, F2, and the ratio of the the energy of the light energy taken to the energy available in a primary beam goes to 0.63, because of the fact that two 16/9 format rectangles are inscribed simultaneously, and side by side, each in the circular section of the primary beam whereas for only one inscribed rectangle, as in the prior art, this ratio is 0.54 as indicated in the introduction.

Figure 2:
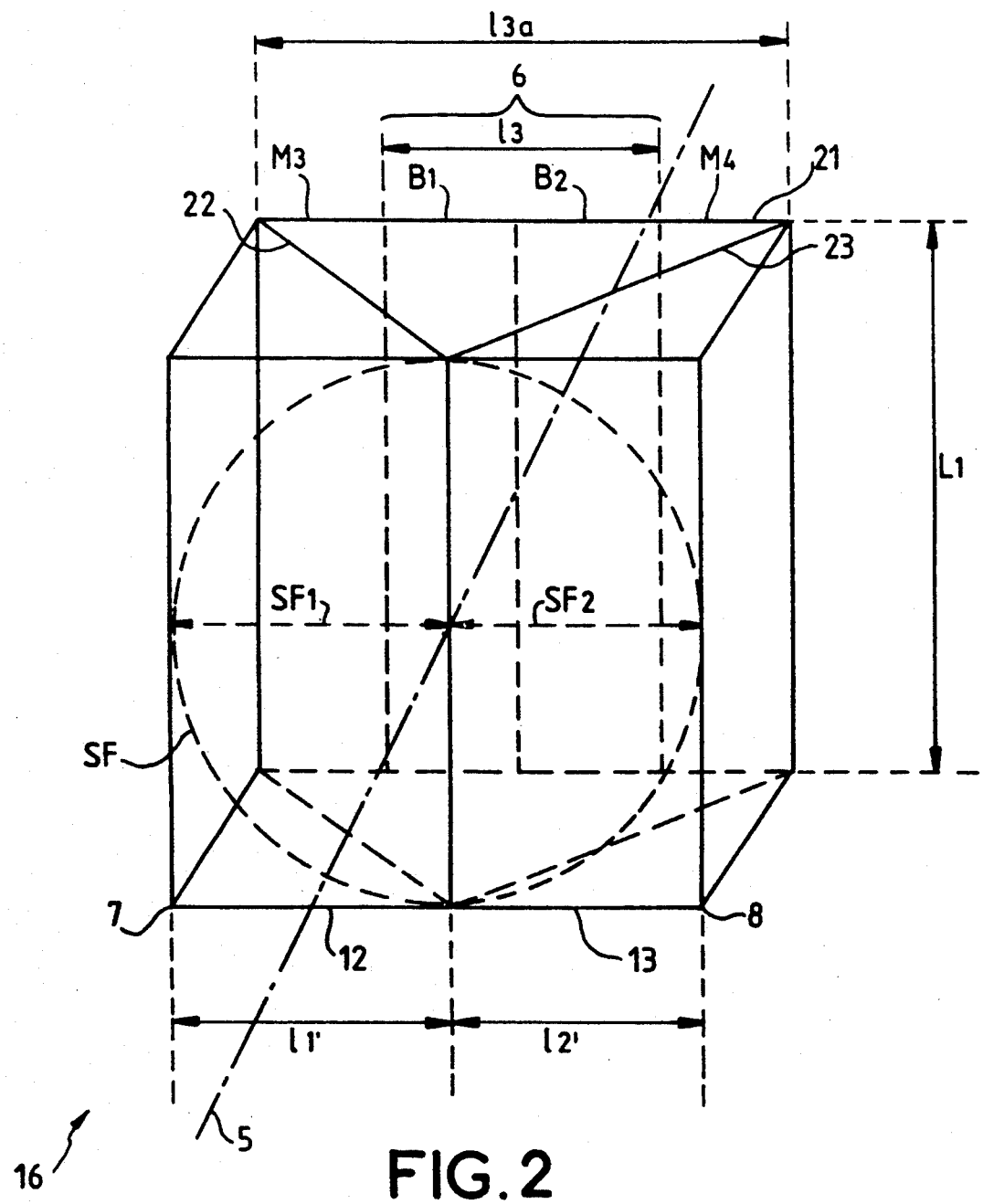
FIG. 2 shows a view in perspective of the prism shown in FIG. 1.

FIG. 2 is a view in perspective of the block or prism 16 which makes it possible to illustrate the inscribing of the selective mirrors in the section of the primary beam FP.

The first and second selective mirrors M1, M2 and the rear face 15 are not shown in the FIG. 2 but they are represented respectively by a first face and a second face 22, 23 and a hypoteneuse face 21 of the prism 16 that bears them. The second mirror M2 is on the face 23 and the rear face 15 is on the hypoteneuse face 21. These mirrors or faces all have the same length L1 given by a height of the prism 16.

The first and second transparent parts 7, 8 are respectively applied against the faces 22 and 23 of the prism 16 and have a same length L1 as these faces. The input faces 12, 13 of these parts are perpendicular to the axis of propagation 5 of the primary beam FP.

Furthermore, it is seen that these input faces 12, 13 have a same width 11', 12' as the apparent width of the selective mirrors M1, M2.

The primary beam FP has a circular cross-section that is represented in the FIG. 2 by a circle SF shown in dashes. It is seen that the two input faces 12, 13 (each with the 16/9 format) positioned side by side add their width 11', 12' to form an almost square shaped surface inscribed i the section of the primary beam FP. The first and second input faces 12, 13 have a same area and a same format as the selective mirrors M1, M2 and these input faces 12, 13 respectively intercept the first and second part SF1, SF2 of the section of the primary beam FP.

The rear face 15 comprises the already mentioned window 6 as well as a third mirror and a fourth mirror M3, M4 positioned on either side of this window 6.

The window 6 has a length L1 equal and parallel to the length of the faces 12, 13 of the parts 7, 8, i.e. equal to the length of the first and second selective mirrors M1, M2; and its width 13 is equal to the apparent widths 11', 12' of these parts while the rear face 15 has a width 13a that is twice that of the window 6. In the non-restrictive example described, the window 6 is centered o the axis of propagation 6 in such a way that it can be considered as being constituted by a first and second band B1, B2 located on either side of the axis of propagation 5 and respectively forming a first and second half window each having the length L1. With the third mirror M3, the first half B1 intercepts the first part SF1 of the section of the primary beam FP. And, with the fourth mirror M4, the second half B2 intercepts the second part SF2 of this primary beam.

Referring again to FIG. 1 it is seen that, according to another characteristic of the invention, the rear face 15 is perpendicular to the propagation axis 5 so as to reflect, towards the light source 2, the unused components of the primary beam FP to form the secondary beams F1, F2, F3.

In the non-restrictive example shown in FIG. 1, the inclination angles a1, a2 of the first and second mirrors M1, M2 are angles of 45° in such a way that the first and second secondary beams F1, F2 get propagated in opposite directions, on a second axis 10 that forms an angle of 90° with the axis of propagation 5 of the primary beam FP.

As can be seen in FIG. 1, the first and second selective mirrors M1, M2 are positioned symmetrically with respect to the axis of propagation 5 and their length is centered on this axis. These two selective mirrors join each other by their length. Their length being perpendicular to the figure, their junction 11 is also perpendicular to the figure and, in the non-restrictive example described, this junction 11 is oriented towards the light source 2 and it is located in a same plane as the axis of propagation 5.

The window 6 is transparent solely for the spectral domain desired for the third secondary beam F3, namely, in the example, for the wavelength corresponding to the green, and it reflects the other components. Since the window 6 is centered on the axis of propagation 5 of the primary beam FP, this axis also constitutes the axis of the third secondary beam F3.

In this configuration, the operation is as follows: the first selective mirror M1 is concerned by the first part SF1 of the primary beam. On the one hand it reflects the blue component, to constitute the first secondary beam F1 and, on the other hand, it is transparent for the other wavelengths of this part of the primary beam. I therefore lets through the red and the green towards the rear face 15. With respect to this first part SF1 of the primary beam that has crossed the first selective mirror M1 (acting for the blue), the rear face 15 presents the third mirror M3 and a first half or band B1 of the window 6 that is transparent only to the green. The third mirror M3 is a total mirror, i.e. it reflects all the wavelengths.

The consequence of this is that:
firstly, with respect to the light that is propagated towards the first half B1 of the window 6, only the green component goes through this window to constitute a part of the third secondary beam F3, and the other components are reflected towards the light source 2 by this first half B1;
secondly, with respect to the light that gets propagated towards the third mirror M3, it is entirely reflected also towards the light source 2.

In short, on the one hand, the third mirror M3 reflects all the components towards the source 2. However, since the blue component has been deflected beforehand by the first selective mirror M1, only the green and red components are reflected along the axis of propagation 5 towards the source 2, by the third mirror M3. These are components that are symbolized in FIG. 1 respectively by an arrow referenced r1 and an arrow rferenced v1. On the other hand, with respect to the light that gets propagated towards the first half B1 of a window, following the action of the first selective mirror M1, it no longer has the components relating to the blue. Since the green is transmitted by this first half B1 of the window, only a red component (symbolized by an arrow referenced rf) is reflected towards the light source 2, parallel to the axis of propagation 5.

A similar operation is found for the second part SF2 of the section of the primary beam, except that the second selective mirror M2 acts for the red. The second selective mirror M2 is positioned on the path of the second part SF2 of the section of the primary beam FP, Firstly, this mirror M2 reflects its component relating to the red in order to constitute the second secondary beam F2. Secondly, this second selective mirror M2 is transparent for the other wavelengths. It therefore lets through the green and blue components contained in this second part SF2 of the primary beam section. This second part SF2 is itself divided into two fractions, one of which gets propagated towards the fourth mirror M4 while the other gets propagated towards the second half B2 of the window 6.

The fourth mirror M4 reflects all the wavelengths towards the light source 2, parallel to the axis 5. It therefore reflects the green and the blue towards the source 2, said green and blue being the only components transmitted by the second selective mirror M2. These components are shown in FIG. 1 respectively by an arrow v2 and an arrow b2. The second half B2 of the window is transparent only for the green in order to contribute to the obtaining of the third secondary beam F3. It therefore reflects all the other components towards the light source 2, these other components being, in this example, the blue illustrated in FIG. 1 by an arrow referenced b2'.

This arrangement of the first and second selective mirrors M1, M2 of the rear face 15 makes it possible to obtain the three secondary beams F1, F2, F3, having different wavelengths and rectangular sections, notably at the 16/9 format, from the section of the primary beam FP. It also enables the sending back, towards the light source 2, in parallel to the axis of propagation 5, of the light that has not been used to constitute the secondary beams F1, F2, F3. Through the reflector 4, this light energy gets added the the light energy that has just been produced to constitute the primary beam FP, and it is distributed throughout the section of this beam FP. This recycled light also tends to constitute the secondary beams F1, F2, F3.

The first and second selective mirrors M1, M2 and the rear face 15 are constitued from elements that are standard per se. The selective mirrors M1, M2 may be formed, for example, by a stack of dielectric thin layers according to the standard technique of interference filters.

These selective mirrors M1, M2 may be made directly on the faces of the prism 16, but they may also be made on glass plates and then positioned between the prism 16 and the transparent parts 7, 8.

Since the window 6 is constituted by two parts or bands B1, B2, both transparent to the green but with the first one reflecting the blue and the second one reflecting the red, these bands may be constituted by selective mirrors. The important point is that they should all reflect incident light other than the green, and they may be replaced by a green band passband filter.

Naturally, the wavelengths attributed to each secondary beam may be permutated. It is enough to make each selective mirror so that it reflects the desired wavelength.

It should be further noted that the above description of the rear face 15 can be applied to the production of three secondary beams F1, F2, F2 with rectangular sections. But the invention retains its value even when only two secondary beams are needed. In this case, it is enough to replace the window 6 (transparent to the wavelengths of the third secondary beam F3) by a total mirror reflecting all the wavelengths, in a same way as the third and fourth mirrors M3, M4.

What is claimed is:

1. A light beam generator device, comprising a light source producing a light beam called a primary beam, the spectrum of which is substantially that of visible light, a light splitter illuminated by the primary beam and producing, in return, at least two secondary beams corresponding to different wavelengths, the first and second of the secondary beams being obtained respectively by means of a first mirror and second mirror that are selective in wavelength, wherein the first and second selective mirrors are positioned so as to intercept different parts of the section of the primary beam, and wherein the light splitter further has a rear face at least partially constituting a total mirror, the rear face being, firstly, located opposite the light source with respect to the first and second selective mirrors and being, secondly, in a plane perpendicular to an axis of propagation of the primary beam.

2. A generator device according to claim 1, wherein the rear face comprises a window transparent to wavelengths different from those of the first and second secondary beams so as to produce a third secondary beam.

3. A generator device according to claim 1, wherein the first and second selective mirrors are inclined on the axis of propagation along angles of inclination, and wherein, seen from the light source, these two selective mirrors have rectangular apparent surfaces.

4. A generator device according to claim 3, wherein the apparent surfaces of the first and second selective mirrors have the 16/9 format.

5. A generator device according to claim 3, wherein the first and second selective mirrors are joined on the axis of propagation.

6. A generator device according to claim 5, wherein a junction of the first and second selective mirrors is oriented towards the light source.

7. A generator device according to claim 2, wherein the window has a surface area equal to the area of an apparent surface area of the first and second selective mirrors and a same format.

8. A generator device according to claim 7, wherein the window is substantially centered on the axis of propagation.

9. A generator device according to claim 7, wherein a first part of the window is reflective at least with respect to the wavelengths constituting the second secondary beam, an wherein a second part of this window is reflective at least with respect to the wavelengths constituting the first secondary beam.

10. A generator device according to claim 9, wherein the first and the second part of the window each constitute a selective mirror.

11. A generator device according to claim 1, comprising a transparent block forming a triangular sectioned prism, and wherein the first and second selective mirrors and the rear face are each positioned on a face of said prism.

12. A generator device according to claim 11, wherein the first and second selective mirrors are each positioned between the prism and a transparent part having an input face and an output face through which there respectively pass a part of primary beam and a secondary beam, the transparent part being such that the input face and the output face are respectively normal to the axis of the primary beam and to the axis of the secondary beam.

13. A generator device according to any of the above claims, wherein the selective mirrors are constituted by stacks of dielectric thin layers.

* * * * *